United States Patent [19]

Heinlein

[11] Patent Number: 5,121,088
[45] Date of Patent: Jun. 9, 1992

[54] FREQUENCY RESPONSE EQUALIZER

[75] Inventor: Werner Heinlein, Grosshabersdorf, Fed. Rep. of Germany

[73] Assignee: U.S. Philips Corporation, New York, N.Y.

[21] Appl. No.: 644,070

[22] Filed: Jan. 18, 1991

[30] Foreign Application Priority Data

Jan. 18, 1990 [DE] Fed. Rep. of Germany ....... 4001299

[51] Int. Cl.$^5$ .............................................. H03H 5/00
[52] U.S. Cl. ................... 333/28 R; 333/24 R; 333/18; 333/175
[58] Field of Search ............... 333/18, 24 R, 28 R, 333/170, 171, 175

[56] References Cited

U.S. PATENT DOCUMENTS 3,858,126  12/1974  Kameya ............... 333/24 R
3,879,689  4/1975   Seidel ................. 333/28 R
4,208,640  6/1980   van der Meijs ........ 333/18

Primary Examiner—Eugene R. LaRoche
Assistant Examiner—Michael B. Shingleton
Attorney, Agent, or Firm—Edward W. Goodman

[57] ABSTRACT

A frequency response equalizer, particularly for wideband networks, whose purpose is to reduce the influence of parasitic capacitances on the frequency behavior, includes the series arrangement of a first coil, a capacitor, a resistor and a second coil, in parallel with a series resistor, in which series arrangement the coils constitute a bifilarly wound transformer. The transformer includes two main inductances and two leakage sub-inductances, in series with the resistor and the capacitor, being arranged in parallel with the series resistor as an active series resonant circuit.

20 Claims, 2 Drawing Sheets

FREQUENCY RESPONSE EQUALIZER

BACKGROUND OF THE INVENTION

The invention relates to a frequency response equalizer, particularly for wideband networks.

In wideband networks, for example, in cable television systems, wideband amplifiers are arranged in given cable sections for compensating the cable attenuation. In these networks amplification errors of a desired smooth frequency response may be caused by amplification tolerances in the frequency response of the individual amplifiers within a transmission path of the wideband network. Such amplification errors can be compensated by frequency response equalizers. To this end individual amplifiers within the transmission path may be preceded by attenuation members having a passband attenuation. Their attenuation can be eliminated in an adjustable frequency range by means of additionally available resonant circuits. To determine a passband attenuation, a series resistor may precede the amplifier. This resistor may be arranged in parallel with a series resonant circuit constituted by a resistor, a capacitor and a coil. The passband attenuation at a resonance frequency, which can be adjusted by means of the value of the capacitor, can be reduced or eliminated by means of the value of the resistor. The frequency behavior of such a frequency response equalizer can be negatively influenced by parasitic capacitances, for example, parasitic ground capacitances, because the parasitic ground capacitances and the coil constitute an interference resonant circuit. The smaller the capacitance of the capacitor of the series resonant circuit, the greater the interfering influence of the interference resonant circuit. In addition to the desired reduction of the attenuation at the resonance frequency of the series resonant circuit, an unwanted increase of the attenuation occurs, particularly at higher resonance frequencies. If the value of the capacitor approaches the value of the parasitic capacitances, the influence of the interference resonant circuit may become greater than that of the series resonant circuit itself, which leads to an unwanted increase of the attenuation at the interference resonance frequency instead of to the desired reduction of the attenuation at the resonance frequency of the series resonant circuit.

SUMMARY OF THE INVENTION

It is an object of the invention to provide a frequency response equalizer in which the influence of parasitic capacitances on the frequency behaviour is reduced and which can be used up to high frequencies.

This object is achieved in that a first coil in series with a capacitor, a resistor and a second coil is arranged in parallel with a series resistor, the coils constituting a bifilarly wound transformer.

The transformer comprises two main inductances and two leakage sub-inductances. Interference resonant circuits constituted by the main inductances and parasitic capacitances cannot become active because the main inductances have a high resistance, particularly at high frequencies and substantially suppress the parasitic capacitances. The quality of the transformer has no influence on the operation of a series resonant circuit constituted by the two leakage sub-inductances in series with the capacitor and the resistor, because the influence of the main inductances is eliminated as their magnetic fluxes cancel each other as a result of the bifilary winding of the transformer. Thus, the influence of parasitic capacitances is eliminated so that the frequency response equalizer can be used up to high frequencies of over 650 MHz.

Advantageous embodiments are described in the subclaims.

BRIEF DESCRIPTION OF THE DRAWING

The invention will now be described in greater detail with reference to the embodiments shown in FIGS. 1 to 4.

DETAILED DESCRIPTION OF PREFERRED EMBODIMENT OF THE INVENTION

Figure 1:
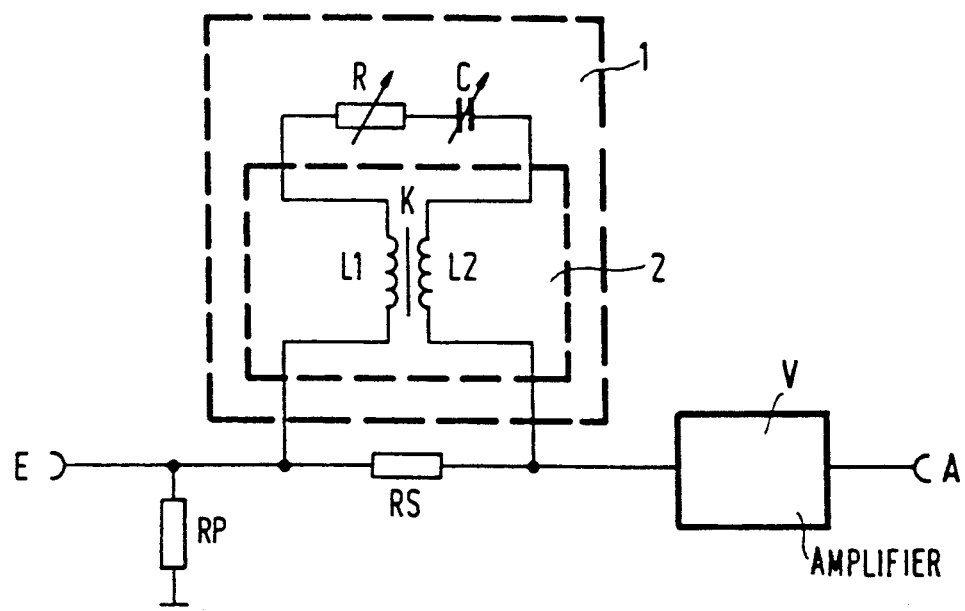
FIG. 1 shows a transmission path including a frequency response equalizer.

In the circuit arrangement shown in FIG. 1 a series resistor RS in series with an amplifier V is arranged between an input E and an output A of a transmission path for cable television systems. The input E is connected to ground potential via a parallel resistor RP for adapting the input resistance of the amplifier V. A series circuit 1 comprising a first coil L1, an adjustable resistor R, an adjustable capacitor C and a second coil L2 is arranged in parallel with the series resistor RS. The coils L1, L2 are bifilarly wound and inductively coupled to each other. In the embodiment shown in FIG. 1 the coupling is constituted by means of a common core K so that the coils L1, L2 in connection with the core K constitute a transformer 2 in which the core K consists of a ferromagnetic material.

The series circuit 1 represents a series resonant circuit whose quality can be varied by means of the adjustable resistor R. The resonance frequency of the series resonant circuit 1 can be determined by means of the adjustable capacitor C. Because of its bifilar winding, the transformer 2 constituted by the coils L1, L2 and their core K comprises two main inductances each having different signs and a leakage inductance (FIG. 3) composed of two leakage sub-inductances, the values of the main inductances being much higher than those of the leakage sub-inductances. Interference resonant circuits constituted by the main inductances and parasitic capacitances cannot become active, because the main inductances also have a higher inductive resistance particularly at high frequencies and thus substantially suppress the parasitic capacitances which are particularly active at high frequencies. It is thereby ensured that the circuit can be used up to high frequencies (over 650 MHz). As the magnetic fluxes of the two main inductances cancel each other due to the bifilar winding of the transformer 2, i.e. the main inductances have different signs, these inductances do not influence the behavior of the series resonant circuit. Thus an effective series resonant circuit 1 comprising the two leakage sub-inductances in series with the capacitor and the resistor (cf. FIG. 4) is obtained parallel to the series resistor.

Figure 2:
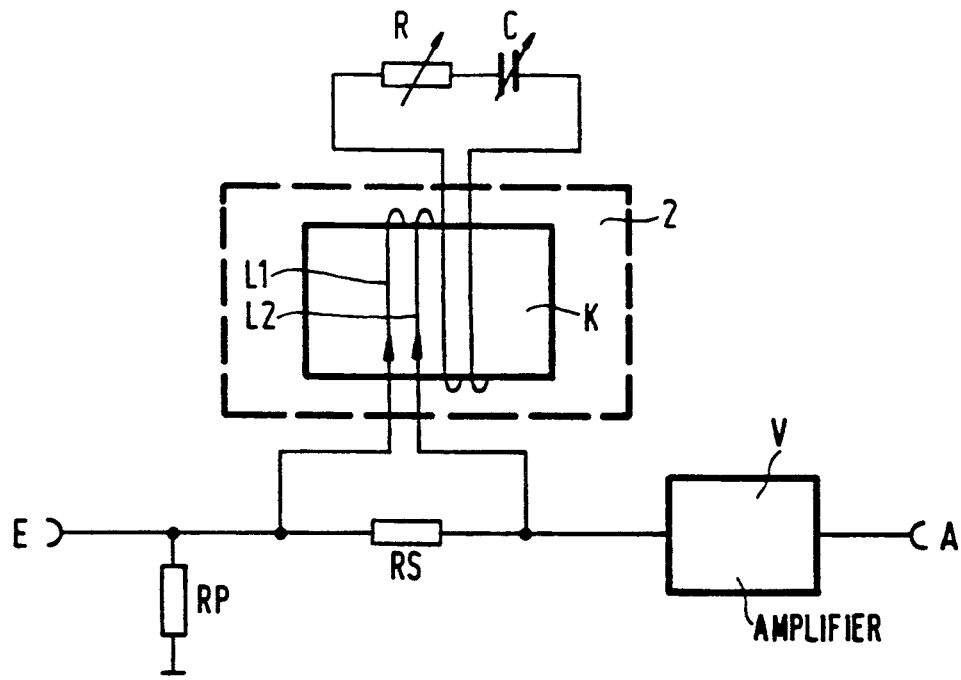
FIG. 2 shows a transmission path including a frequency response equalizer which comprises a bifilarly wound transformer shown diagrammatically.

FIG. 2 shows a transmission path including a frequency response equalizer in which the structure of the winding of the bifilarly wound transformer 2 is diagrammatically accentuated. As already described with reference to FIG. 1, the circuit comprising the series resistor RS, the parallel resistor RP and the amplifier V is arranged between the input E and the output A of a transformer network for cable television systems. The starts of the windings of the coils L1, L2 are connected to the series resistor RS and bifilarly wound around the core K. The ends of the windings of the coils L1, L2 are connected to the series arrangement of the adjustable resistor R and the adjustable capacitor C. The winding direction of the coils L1, L2 is clarified by means of arrows. Advantageously, the core K is constituted as a double-aperture core, while the value of the leakage sub-inductances LS/2 can be dimensioned within narrow tolerances when using a bifilar winding.

Figure 3:
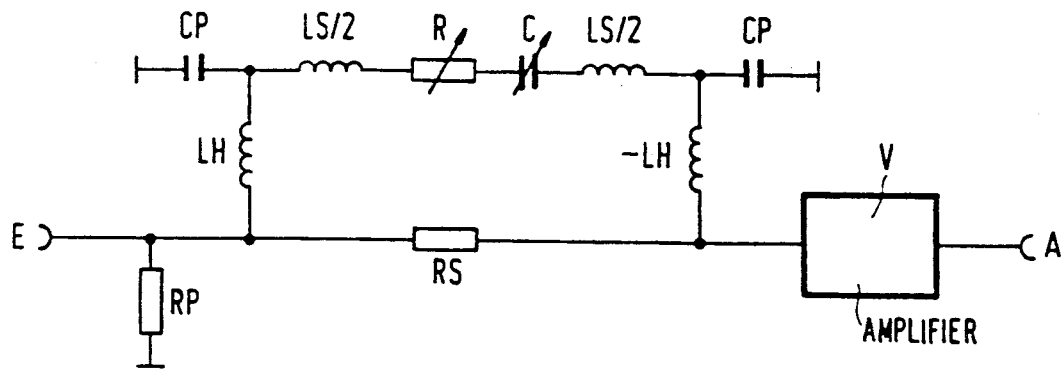
FIG. 3 shows the equivalent circuit diagramme of a frequency response equalizer.

FIG. 3 shows a transmission path including a frequency response equalizer shown in an equivalent circuit diagram of the bifilarly wound transformer 2 of FIGS. 1, 2. The main inductances LH, -LH of the transformer 2 are connected to the series resistor RS and are arranged in series with the two leakage sub-inductances LS/2 which are interconnected via a series arrangement of the adjustable resistor R and the adjustable capacitor C. Respective parasitic capacitances CP are arranged between the common tap of the main inductances LH, -LH and the leakage sub-inductance LS/2 and the ground potential.

It is true that interference resonant circuits are formed from the main inductances LH, -LH and the parasitic capacitances CP, but their resonance interferences cannot become active because the quality of the interference resonant circuits is very low due to the material of the core 1 which is effective for the main inductances LH, -LH. The parasitic capacitances CP are suppressed by the main inductances LH, -LH which also have a high inductive resistance at high frequencies. The influence of the parasitic capacitances CP is thus eliminated, so that the frequency response equalizer can be used up to high frequencies of over 650 MHz.

Figure 4:
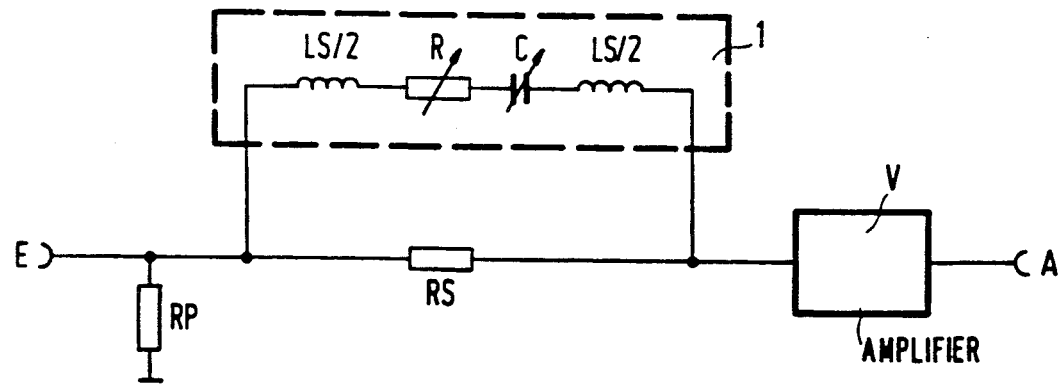
FIG. 4 shows the active equivalent circuit diagramme of a frequency response equalizer.

FIG. 4 is the active equivalent circuit diagram of a transmission path of a cable television system including a frequency response equalizer shown by way of the equivalent circuit diagramme of FIG. 3. The series resonant circuit 1 is constituted by the two leakage sub-inductances LS/2 in series with the adjustable resistor R and the adjustable capacitor C. As already described with reference to FIGS. 1 to 3, the main inductances (cf. FIG. 3) have no influence on the behavior of the series resonant circuit 1, because the magnetic fluxes of the two main inductances LH, -LH cancel each other.

I claim:

1. A frequency response equalizer, particularly for wideband networks, comprising:
   a series resistor inserted in said wideband network; and
   a series circuit including a first coil, a capacitor, a resistor and a second coil, said series circuit being arranged in parallel with said series resistor, and said first and said second coils constituting a bifilarly wound transformer.

2. A frequency response equalizer as claimed in claim 1, wherein the transformer comprises two main inductances and two leakage sub-inductances, the effects of the two main inductances cancelling each other.

3. A frequency response equalizer as claimed in claim 1, wherein two leakage sub-inductances of the transformer (2) in series with the resistor and the capacitor are arranged in parallel with the series resistor as an active series resonant circuit.

4. A frequency response equalizer as claimed in claim 1, wherein the coils have a common core of ferromagnetic material.

5. A frequency response equalizer as claimed in claim 2, wherein said bifilary wound transformer comprises a that is constituted as a double-aperture core.

6. A frequency response equalizer as claimed in claim 1 wherein the resistor and the capacitor are adjustable.

7. A frequency response equalizer as claimed in claim 2 wherein two leakage sub-inductances of the transformer in series with the resistor and the capacitor are arranged in parallel with the series resistor as an active series resonant circuit.

8. A frequency response equalizer as claimed in claim 2, wherein the coils have a common core of ferromagnetic material.

9. A frequency response equalizer as claimed in claim 3, wherein the coils have a common core of ferromagnetic material.

10. A frequency response equalizer as claimed in claim 7, wherein the coils have a common core of ferromagnetic material.

11. A frequency response equalizer as claimed in claim 2, wherein said bifilarly wound transformer comprises a core that is constituted as a double-aperture core.

12. A frequency response equalizer as claimed in claim 3, wherein said bifilarly wound transformer comprises a core that is constituted as a double-aperture core.

13. A frequency response equalizer as claimed in claim 4, wherein the core is constituted as a double-aperture core.

14. A frequency response equalizer as claimed in claim 7, wherein said bifilarly wound transformer comprises a core that is constituted as a double-aperture core.

15. A frequency response equalizer as claimed in claim 10, wherein the core is constituted as s double-aperture core.

16. A frequency response equalizer as claimed in claim 2, wherein the resistor and the capacitor are adjustable.

17. A frequency response equalizer as claimed in claim 3, wherein the resistor and the capacitor are adjustable.

18. A frequency response equalizer as claimed in claim 4, wherein the resistor and the capacitor are adjustable.

19. A frequency response equalizer as claimed in claim 5, wherein the resistor and the capacitor are adjustable.

20. A frequency response equalizer as claimed in claim 11, wherein the resistor and the capacitor are adjustable.

* * * * *